(12) United States Patent
Gan

(10) Patent No.: US 12,233,384 B2
(45) Date of Patent: Feb. 25, 2025

(54) BUBBLE COUNTER

(71) Applicant: Xiaopeng Gan, Wenzhou (CN)

(72) Inventor: Xiaopeng Gan, Wenzhou (CN)

( * ) Notice: Subject to any disclaimer, the term of this patent is extended or adjusted under 35 U.S.C. 154(b) by 461 days.

(21) Appl. No.: 17/813,910

(22) Filed: Jul. 20, 2022

(65) Prior Publication Data

US 2023/0182092 A1 Jun. 15, 2023

(30) Foreign Application Priority Data

Dec. 12, 2021 (CN) .......................... 202111513262.4

(51) Int. Cl.
*B01F 23/231* (2022.01)
*A01K 63/04* (2006.01)

(52) U.S. Cl.
CPC ...... *B01F 23/23122* (2022.01); *A01K 63/042* (2013.01)

(58) Field of Classification Search
CPC .................. A01K 63/042; B01F 23/23122
USPC ....................................................... 261/126
See application file for complete search history.

(56) References Cited

FOREIGN PATENT DOCUMENTS

| CN | 203105358 U | * | 8/2013 |
| CN | 205671175 U | * | 11/2016 |
| CN | 217179670 U | * | 8/2022 |

OTHER PUBLICATIONS

English Machine Translation of CN 203105358 U (Year: 2013).*
English Machine Translation of CN 205671175 U (Year: 2016).*
English Machine Translation of CN 217179670 U (Year: 2022).*

* cited by examiner

*Primary Examiner* — Charles S Bushey
(74) *Attorney, Agent, or Firm* — Hemisphere Law, PLLC; Zhigang Ma

(57) ABSTRACT

A bubble counter includes a body. The body is provided with a gas inlet, a gas outlet, a cavity, a water inlet, a water inlet channel, a first check valve and a second check valve. An end of the water inlet channel is connected to the water inlet, and another end of the water inlet channel is connected to the cavity. The first check valve is arranged between the gas inlet and the cavity, and the second check valve is arranged at a connection between the water inlet channel and the cavity. The water inlet channel and the gas outlet are independent from each other. With the bubble counter, it is not required to turn off or disassemble the bubble counter, water can be added at any time and gas leakage can be prevented.

11 Claims, 3 Drawing Sheets

BUBBLE COUNTER

TECHNICAL FIELD

The present disclosure relates to a bubble counter.

DESCRIPTION OF RELATED ART

A bubble counter is used to measure a flow rate, a volume or the like of gas passing through a pipe. Most existing bubble counters are vertical-typed, and each of which has a gas inlet at a lower end thereof and a gas outlet at an upper end thereof. Specifically, an effect of gas bubbling in a liquid to form bubbles can be achieved by placing the liquid in the vertical-typed bubble counter. An operator may observe a size and a speed of the bubbles to determine a content of the gas.

An existing bubble counter may be used in aquarium apparatuses and connected to a carbon dioxide cylinder to supply carbon dioxide gas in a fish tank and thereby provide photosynthetic nutrients for greenery in the fish tank. However, with respect to the existing bubble counter, during the process of use, the flowing of the carbon dioxide gas would lead water in the bubble counter to be carried away, such that the water in the bubble counter is gradually reduced in a long run, and an actual measurement effect is affected seriously. As such, the operator is required to add water to the bubble counter, and an existing operation method is to turn off the bubble counter and then disassemble the bubble counter for water adding. Resulting from the existing operation method needs to turn off the bubble counter, an actual normal use effect is seriously affected.

SUMMARY

A main technical problem to be solved of the present disclosure is to provide a bubble counter.

A technical solution to the above technical problem of the present disclosure is as follows. A bubble counter is provided, which may include a body, where the body is provided with a gas inlet, a gas outlet, a cavity, a water inlet, a water inlet channel, a first check valve, and a second check valve; where an end of the water inlet channel is connected to the water inlet, and another end of the water inlet channel is connected to the cavity; and where the first check valve is arranged between the gas inlet and the cavity, the second check valve is arranged at a connection between the water inlet channel and the cavity; and the water inlet channel and the gas outlet are independent from each other.

With the above structure, due to the arrangement of the first check valve, water in the cavity would not flow back into a carbon dioxide cylinder through the gas inlet, whereas carbon dioxide gas can be discharged into a water tank through the gas outlet. When water needs to be injected into the cavity, water can be injected through the water inlet; further, due to the arrangement of the second check valve, only external water can enter the cavity, and gas in the cavity cannot be discharged through the water inlet channel. According to the structure, in a normal use process, it is not required to stop the operation of the bubble counter or perform a disassembling operation of the bubble counter, and the effect of water adding can be achieved merely by adding water via the water inlet, without affecting a normal operation of the bubble counter.

In an embodiment, the body may be further provided with a gas outlet channel, an end of the gas outlet channel is connected to the cavity, another end of the gas outlet channel is connected to the gas outlet, and the gas outlet channel is isolated from the second check valve.

The gas outlet channel is arranged with the above structure mainly for considering a space utilization rate, and at the same time, it is necessary to ensure normal smoothness of gas outlet, so as to prevent the gas outlet channel from crossing with the water inlet channel and thereby causing gas leakage.

In an embodiment, the second check valve and the cavity may be non-coaxially arranged.

Since the second check valve has a large volume, so different axes arrangements are adopted for the second check valve and the first connector, thereby reducing the influence of the second check valve on a whole space. Meanwhile, with the different axes arrangements, the second check valve is more convenient to be installed and fixed, and in a process of water injection, a state of water flow can be observed more intuitively, thus improving the convenience of water injection.

In an embodiment, the body may be further provided with a slot therein, the second check valve may be provided therein with a protrusion corresponding to the slot, and the protrusion extends into the slot.

The arrangement of the slot and the protrusion causes a better fixing effect of the second check valve during a fixing process thereof. Furthermore, in order to improve a gas tightness of the connection between the first check valve and the body, a sealing ring may be sleeved on the second check valve, to prevent gas leakage.

In an embodiment, the body may further include a first connector and a housing; the gas outlet, the water inlet and the second check valve are arranged in the first connector, and the housing is in threaded connection with the first connector.

Due to the arrangement of the first connector, a whole processing of the bubble counter is more convenient; and since the housing can be in threaded connection with the first connector, an assembly efficiency of the whole bubble counter is greatly increased.

In an embodiment, the bubble counter may further include a first sealing member, where the first sealing member is arranged between the housing and the first connector.

Due to the arrangement of the first sealing member, a sealing effect between the housing and the first connector is better.

In an embodiment, the body may further include a second connector, the first check valve is arranged in the second connector, and the second connector is in threaded connection with the housing.

Due to the arrangement of the second connector, the fixing of the first check valve is more convenient; and an assembly efficiency of the whole bubble counter can be greatly increased through connecting and matching the second connection portion with the housing.

In an embodiment, the bubble counter may further include a second sealing member; where the second sealing member is arranged between the housing and the second connector.

Due to the arrangement of the second sealing member, a sealing effect between the housing and the second connector is better.

In an embodiment, the bubble counter may be further include a third sealing member; where the third sealing member is arranged at a connection between the water inlet channel and the water inlet.

Due to the arrangement of the third sealing member, water leakage is not prone to occur during water injection.

In an embodiment, a boss is disposed in the cavity, the boss is provided with a first channel therein, and the first channel is connected to a gas inlet channel.

The arrangement of the boss allows gas to enter the cavity through the boss, and thus an overall bubble display effect is better compared with a related art, in which gas enters from the lower end of the housing directly, and a volume and a frequency of the gas are difficult to be carefully calculated by hand. It should be noted that, in an operation process of the present disclosure, the skilled in the art can adjust a flow rate of carbon dioxide gas based on determining N bubbles generated in N seconds.

DETAILED DESCRIPTION OF EMBODIMENT

First Embodiment

Figure 1:
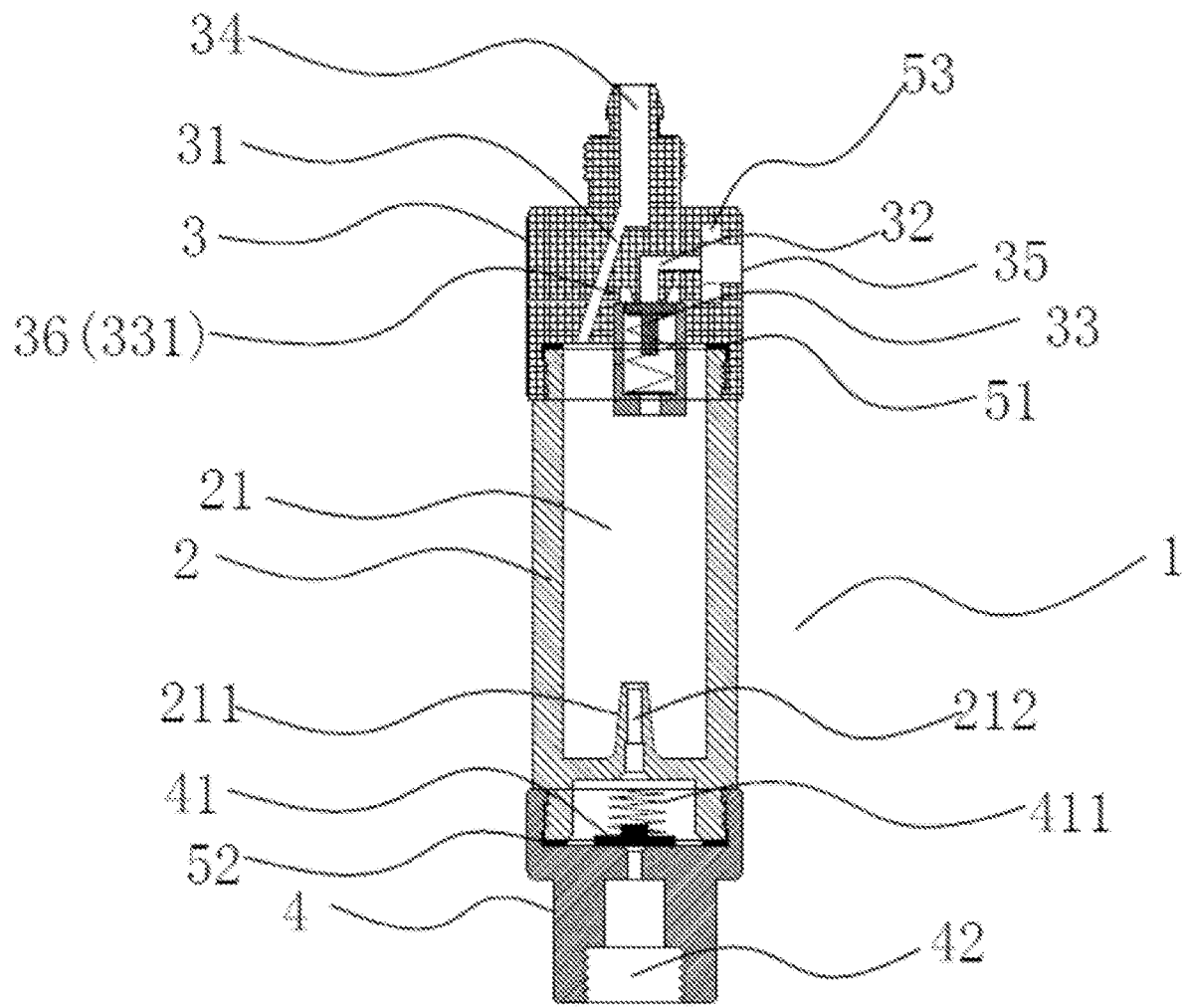
FIG. 1 illustrates a sectional view of a bubble counter according to a first embodiment of the present disclosure.
Figure 2:
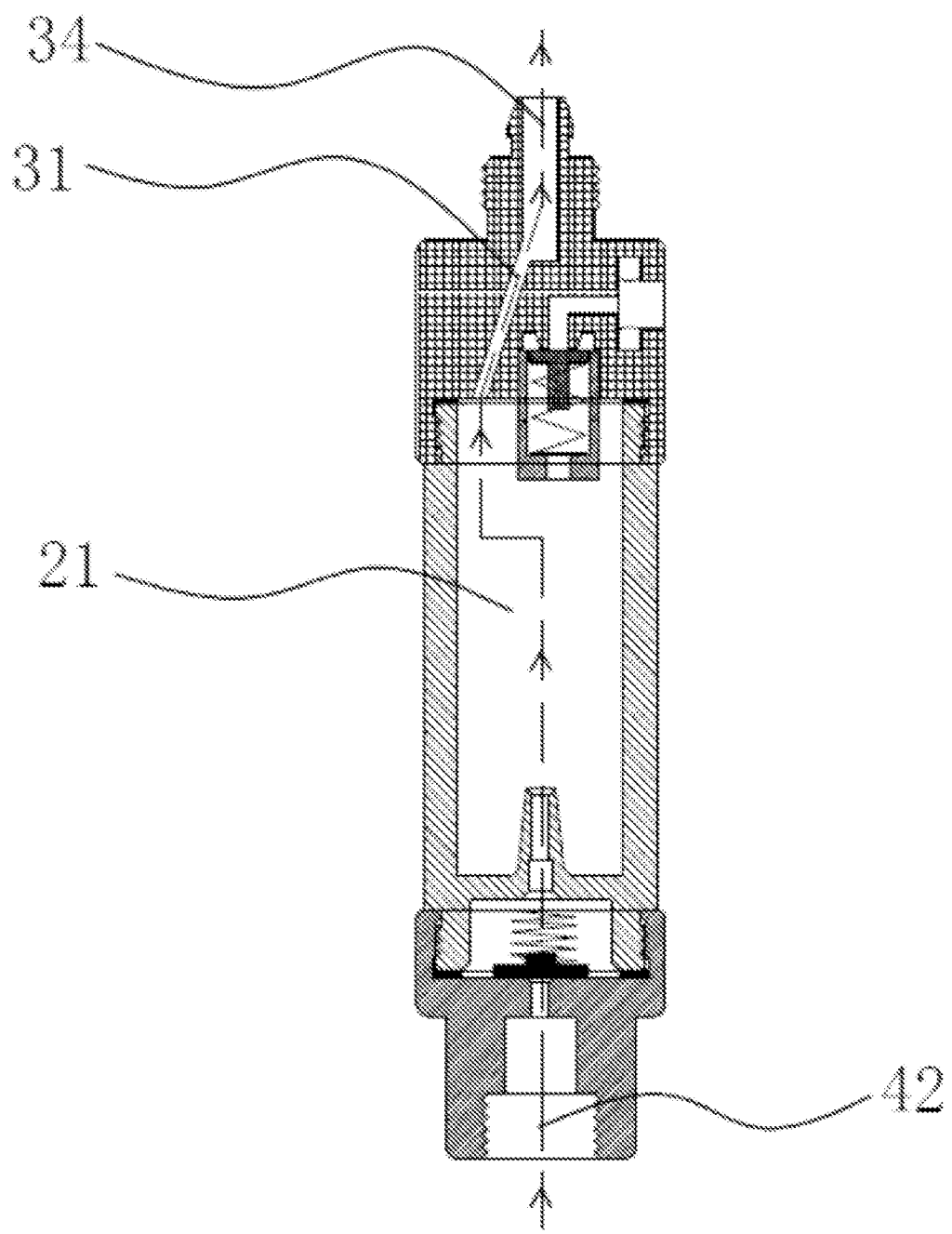
FIG. 2 illustrates a sectional view showing gas flow from a gas inlet to a gas outlet according to the first embodiment of the present disclosure.
Figure 3:
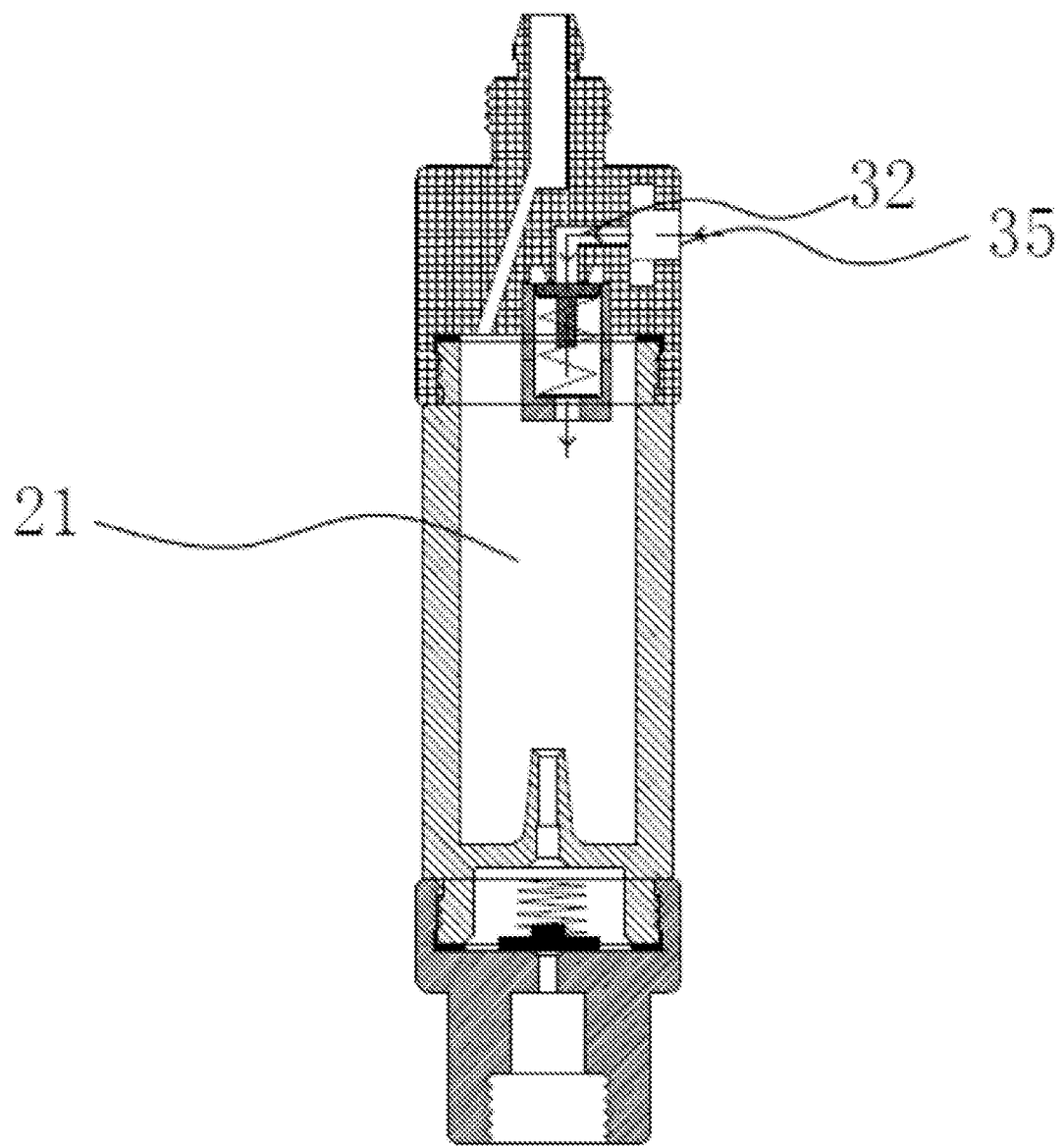
FIG. 3 illustrates a sectional view showing water flow according to the first embodiment of the present disclosure.

Referring to FIGS. 1 to 3, a bubble counter is provided, which may include a body 1, and the body 1 includes a housing 2, a first connector 3 and a second connector 4.

The housing 2 is hollow and transparent, an upper end of the housing 2 is connected and cooperates with the first connector 3, and a lower end of the housing 2 is connected and cooperates with the second connector 4. In a preferable embodiment, the above connection is a screw connection. The housing 2 is provided with a cavity 21 therein. A boss 211 is disposed in the cavity 21. The boss 211 is provided with a first channel 212 therein. The first channel 212 connects with a gas inlet channel. The arrangement of the boss 211 allows gas to enter the cavity 21 through the boss 211, and thus an overall bubble display effect is better compared with a related art, in which gas enters from the lower end of the housing directly, and a volume and a frequency of the gas are difficult to be carefully calculated by hand. It should be noted that, in an operation process of the present disclosure, the skilled in the art can adjust a flow rate of carbon dioxide gas based on determining N bubbles generated in N seconds.

In the embodiment, the housing 2 may be made of transparent glass or transparent plastic, which can be selected by the skilled in the art according to actual requirements.

The first connector 3 is provided therein with a gas outlet channel 31, a water inlet channel 32, a second check valve (also referred to as one-way valve) 33, a gas outlet 34, and a water inlet 35.

A lower end of the first connector 3 is in threaded connection with an outer wall of the housing 2, so that the connection between the first connector 3 and the housing 2 is realized, and an overall assembly efficiency is greatly increased by the threaded connection. Further, in order to improve a sealing effect between the housing 2 and the first connector 3, a first sealing member 51 is provided between the housing 2 and the first connector 3. The first sealing member 51 is preferably made of rubber.

The gas outlet 34 is arranged at a center of an upper end of the first connector 3. Specifically, the gas outlet 34 extends vertically toward the upper end of the first connector 3, and a size of the gas outlet 34 in the embodiment is larger than that of the gas outlet channel 31 in order to make the gas outlet 34 smoother. Furthermore, an upper part of the first connector 3 is further provided with an external thread, through which the first connector is connected to devices such as a water pipe to thereby realize a communication effect of a whole gas channel.

An end of the gas outlet channel 31 is connected to the cavity 21, which realizes a communication effect between the gas outlet channel 31 and the cavity 21. Another end of the gas outlet channel 31 extends upward and connects with the gas outlet 34. In the embodiment as a preferable embodiment, the gas outlet channel adopts an inclined-upward extension arrangement, mainly considering a space utilization rate, and at the same time, it is necessary to ensure normal smoothness of gas outlet, so as to prevent the gas outlet channel 31 from crossing with the water inlet channel 32 and thereby causing gas leakage. Further, since the gas outlet 34 and the cavity 21 are coaxially arranged, an incline treatment is required to realize a communication effect between the gas outlet channel 31 and the gas outlet 34. In addition, the gas outlet channel 31 may be vertically bent for connection, or may be spirally extended upward.

The second check valve 33 is fixed in the first connector 3. In the embodiment, as a prefer embodiment, the second check valve 33 is non-coaxially arranged with the first connector 3, and the second check valve 33 is arranged in a direction near the lower end and a right side of the first connector 3. The second check valve 33 has a large volume, the second check valve 33 is isolated from the outlet channel 31 (i.e., there is no intersection between the second check valve 33 and the outlet channel 31), the outlet channel 31 is inclined upward at a left side of the first connector 3, and the second check valve 33 is arranged on the right side of the first connector 3, so different axes arrangement are adopted for the second check valve 33 and the first connector 3, thereby reducing the influence of the second check valve 33 on a whole space. Meanwhile, with the different axes arrangements, the second check valve 33 is more convenient to be installed and fixed, and in a process of water injection, a state of water flow can be observed more intuitively, thus improving the convenience of water injection. In order to improve a fixing effect between the second check valve 33 and the first connector 3, the first connector 3 is provided with a slot 36 therein, the second check valve 33 is provided with a protrusion 331 therein corresponding to the slot 36, and the protrusion 331 extends into the slot 36. The arrangement of the slot 36 and the protrusion 331 causes a better fixing effect of the second check valve 33 during a fixing process thereof. Furthermore, in order to improve a gas tightness of the connection between the second check valve 33 and the body 1, a sealing ring may be sleeved on the second check valve 33, to prevent gas leakage, and the sealing ring can be specifically sleeved on the protrusion 331. It should be noted that, for the second check valve 33, flow can be performed in one direction, including flow of gas and liquid, but flow cannot be performed in the other direction, which can be obtained from the related art, so a specific structure of the check valve will not be described in the embodiment.

An end of the water inlet channel 32 is connected to the second check valve 33, and another end is connected with the water inlet 35. The water inlet channel 32 extends upward first, and then laterally and horizontally extends to an outside of the first connector 3, so that the water inlet channel 32 and the gas outlet 31 are independent from each other (there is no intersection between the water inlet channel 32 and the gas outlet channel 31), and thus there is no gas leakage between the water inlet channel 32 and the gas outlet channel 31. Moreover, this connection structure is more convenient in a processing manner. Alternatively, the skilled in the art can also adjust shapes of the gas outlet channel 31 and the water inlet channel 32 according to actual requirements, such as a spiral shape, an inclined shape and so on.

In addition, water is injected through the water inlet 35, and the operator can make a small device such as a needle tube access to the water inlet 35 to realize a water injection effect. Furthermore, a third sealing member 53 is disposed at a connection between the water inlet 35 and the water inlet channel 32. When the bubble counter is used, there is a certain gas pressure difference between the cavity 21 and an external environment, and if there is no third sealing member 53, part of water will seep out during a water injection process and may spill on the operator, therefore, the third sealing member 53 is added.

An upper end of the second connector 4 is in threaded connection with the outer wall of the housing 2. Herein, in order to realize a better sealing effect between the second connector 4 and the housing 2, a second sealing member 52 is arranged between the second connector 4 and the housing 2, for enhancing the sealing effect. A first check valve 41 and a gas inlet 42 are arranged in the second connector 4. The first check valve 41 is turned on in a direction from the gas inlet 42 toward the cavity 21, and an opposite direction thereof corresponds a turned off state. In the embodiment, in order to better fix the first check valve 41, the first check valve 41 is arranged between the housing 2 and the second connector 4, so that the first check valve 41 is firmly fixed in the body 1. Herein, preferably, a reset member 411 of the first check valve 41 abuts against the housing 2, so that the first check valve 41 can be fixed more firmly and stably, and a backflow phenomenon is not easy to occur. Herein, preferably, the reset member 411 is a spring.

The gas inlet 42 is connected to a pressure reducing valve, which is used to connect the gas inlet 42 with a carbon dioxide cylinder. Herein, the second connector 4 is provided with an internal thread, which is convenient to connect and fix with the pressure reducing valve.

With the above structure, due to the arrangement of the first check valve 41, the water in the cavity 21 will not flow back into the carbon dioxide cylinder through the gas inlet 42, whereas carbon dioxide gas can be discharged into a water tank through the gas outlet 34. When water needs to be injected into the cavity 21, water can be injected through the water inlet 35; further, due to the arrangement of the second check valve 33, only external water can enter the cavity 21, and the gas in the cavity 21 cannot be discharged through the water inlet channel 32. According to the structure, in a normal use process, it is not required to stop the operation of related apparatus or perform a disassembling operation, and the effect of adding water can be achieved only by adding water to the water inlet 35, thereby achieving a normal operation of the bubble counter.

What is claimed is:

1. A bubble counter, comprising a body;
wherein the body is provided with a gas inlet, a gas outlet, a cavity, a water inlet, a water inlet channel, a first check valve, and a second check valve;
wherein an end of the water inlet channel is connected to the water inlet, and another end of the water inlet channel is connected to the cavity; and
wherein the first check valve is arranged between the gas inlet and the cavity, the second check valve is arranged at a connection between the water inlet channel and the cavity, and the water inlet channel and the gas outlet are independent from each other.

2. The bubble counter according to claim 1, wherein the body is further provided with a gas outlet channel, an end of the gas outlet channel is connected to the cavity, another end of the gas outlet channel is connected to the gas outlet, and the gas outlet channel is isolated from the second check valve.

3. The bubble counter according to claim 1, wherein the second check valve and the cavity are non-coaxially arranged.

4. The bubble counter according to claim 3, wherein the body is further provided with a slot therein, the second check valve is provided therein with a protrusion corresponding to the slot, and the protrusion extends into the slot.

5. The bubble counter according to claim 1, wherein the body further comprises a first connector and a housing; the gas outlet, the water inlet and the second check valve are arranged in the first connector, and the housing is in threaded connection with the first connector.

6. The bubble counter according to claim 5, further comprising a first sealing member; wherein the first sealing member is arranged between the housing and the first connector.

7. The bubble counter according to claim 1, wherein the body further comprises a second connector, the first check valve is arranged in the second connector, and the second connector is in threaded connection with the housing.

8. The bubble counter according to claim 7, further comprising a second sealing member; wherein the second sealing member is arranged between the housing and the second connector.

9. The bubble counter according to claim 1, further comprising a third sealing member; wherein the third sealing member is arranged at a connection between the water inlet channel and the water inlet.

10. The bubble counter according to claim 1, wherein a boss is disposed in the cavity, the boss is provided with a first channel therein, and the first channel is connected to a gas inlet channel.

11. A bubble counter, comprising:
a housing, having a cavity defined therein;
a first connector, sealingly connected to a first end of the housing; and
a second connector, sealingly connected to a second end of the housing opposite to the first end;
wherein the second connector is provided therein with a gas inlet and a first check valve, the first check valve is arranged between the gas inlet and the cavity;
wherein the first connector is provided therein with a second check valve, a gas outlet, a gas outlet channel, a water inlet, and a water inlet channel; an end of the water inlet channel is connected to the water inlet, and another end of the water inlet channel is connected to the cavity, the second check valve is arranged at a connection between the water inlet channel and the cavity, an end of the gas outlet channel is connected to the cavity, another end of the gas outlet channel is connected to the gas outlet, and the gas outlet channel and the water inlet channel are different channels spaced apart; and wherein a boss is disposed in the cavity, the boss is provided with a first channel therein, and the first channel is connected to the gas inlet.

\* \* \* \* \*